(12) United States Patent
Nakatsugawa et al.

(10) Patent No.: US 8,489,924 B2
(45) Date of Patent: Jul. 16, 2013

(54) EVALUATING APPARATUS AND EVALUATING PROGRAM PRODUCT

(75) Inventors: Minoru Nakatsugawa, Kanagawa (JP); Takeichiro Nishikawa, Kanagawa (JP); Ryusei Shingaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 324 days.

(21) Appl. No.: 12/881,383

(22) Filed: Sep. 14, 2010

(65) Prior Publication Data

US 2011/0239045 A1 Sep. 29, 2011

(30) Foreign Application Priority Data

Mar. 29, 2010 (JP) ................................. 2010-075415

(51) Int. Cl.
*G06F 11/00* (2006.01)

(52) U.S. Cl.
USPC .................................. 714/26; 702/81; 702/82

(58) Field of Classification Search
USPC ............................................................ 714/26
See application file for complete search history.

(56) References Cited

U.S. PATENT DOCUMENTS

| | | | | | |
|---|---|---|---|---|---|
| 5,767,406 | A | * | 6/1998 | Hu | 73/578 |
| 5,965,816 | A | * | 10/1999 | Hu | 73/578 |
| 5,971,596 | A | * | 10/1999 | Nishikawa | 716/112 |
| 6,704,664 | B2 | * | 3/2004 | Su et al. | 702/34 |
| 7,962,302 | B2 | * | 6/2011 | Baseman et al. | 702/82 |
| 2003/0210148 | A1 | * | 11/2003 | Imasaki et al. | 340/573.1 |
| 2004/0133482 | A1 | * | 7/2004 | Wright et al. | 705/27 |
| 2004/0225475 | A1 | * | 11/2004 | Johnson et al. | 702/185 |
| 2005/0222815 | A1 | * | 10/2005 | Tolly | 702/185 |
| 2007/0164729 | A1 | * | 7/2007 | Cowburn et al. | 324/158.1 |
| 2010/0145646 | A1 | * | 6/2010 | Baseman et al. | 702/81 |
| 2010/0250450 | A1 | * | 9/2010 | Nishikawa et al. | 705/302 |
| 2012/0072273 | A1 | * | 3/2012 | Montague | 705/14.4 |
| 2012/0084220 | A1 | * | 4/2012 | Rider et al. | 705/318 |
| 2012/0095930 | A1 | * | 4/2012 | Rider et al. | 705/317 |
| 2012/0123954 | A1 | * | 5/2012 | Rider et al. | 705/317 |
| 2012/0245891 | A1 | * | 9/2012 | Nishikawa et al. | 702/181 |

OTHER PUBLICATIONS

Nigan et al, Learning to Classify Text from Labeled and Unlabeled Documents, Proc. of the 15th National Conference on Artificial Intelligence, pp. 792-799, 1998.

* cited by examiner

*Primary Examiner* — Kamini Patel
(74) *Attorney, Agent, or Firm* — Turocy & Watson, LLP

(57) ABSTRACT

According to one embodiment, an evaluating apparatus includes an operation data storage unit, a labeling unit, a learning unit, and an evaluating unit. The labeling unit applies a failure label, indicating that a product is broken down, to operation data of the product that is broken down within a designated period of time from the observation date of the operation data, while applies a non-failure label, indicating that the product is not broken down, to the operation data of the product that is not broken down within a designated period of time from the observation date of the operation data. The labeling unit applies neither the failure label nor the non-failure label to the operation data of the product, which is not certain that it is broken down or not within a designated period of time from the observation date of the operation data.

6 Claims, 11 Drawing Sheets

FIG.2

| PRODUCT ID | 6548D26H |
|---|---|
| OBSERVATION DATE | 2009/9/17 9:21 |
| TEMPERATURE | 43 °C |
| ACCELERATION IN VERTICAL DIRECTION | 0.8943 G |
| TILT ANGLE | 26.58 |
| NUMBER OF TIMES OF OPERATING BUTTON | 12 |
| CURRENT | 3.2 A |
| VOLTAGE | 12.5 V |
| CONTINUOUSLY-USED TIME | 4:23:14 |
| REVOLUTION OF FAN | 2019 rpm |
| PRESENCE/ABSENCE OF OCCURRENCE OF DATA-READING ERROR | 1 |
| ACCUMULATED USED TIME | 2231 |
| ACCUMULATED NUMBER OF TIMES OF OPERATING BUTTON | 132 |
| ACCUMULATED NUMBER OF TIMES OF OCCURRENCE OF DATA-READING ERROR | 11 |

FIG.3

| PRODUCT ID | 6548D26H |
|---|---|
| DATE WHEN PRODUCT IS BROKEN DOWN | 2009/9/7 13:11 |
| BROKEN-PART ID | P231W664E |
| BROKEN-PART CATEGORY | PCB |

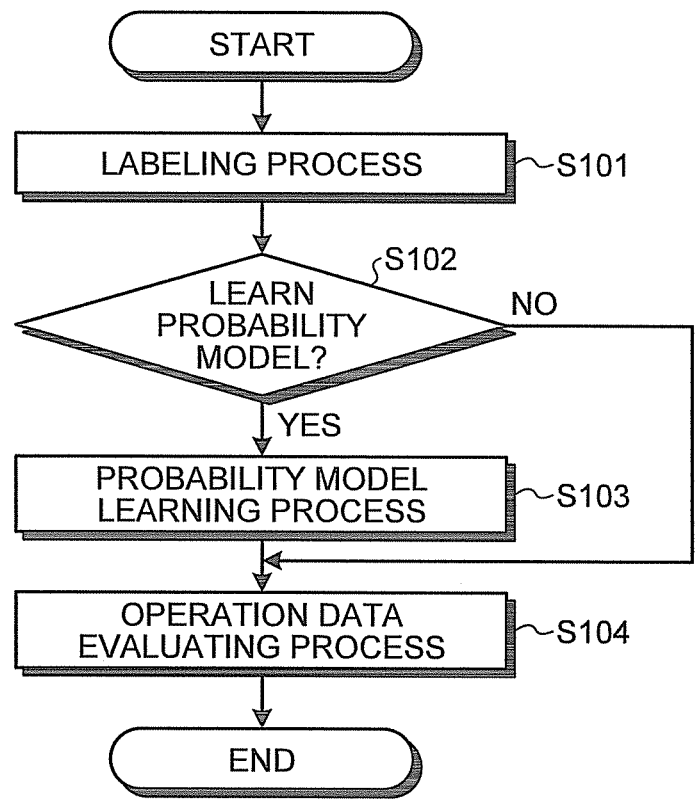

FIG.8

| | | LABEL | | | TOTAL |
|---|---|---|---|---|---|
| | | BROKEN | UNBROKEN | NO LABEL | |
| PRODUCT | PRODUCT 1 | 80 | 0 | 0 | 80 |
| | PRODUCT 2 | 180 | 140 | 0 | 320 |
| | PRODUCT 3 | 0 | 0 | 150 | 150 |
| | PRODUCT 4 | 0 | 250 | 200 | 450 |
| TOTAL | | 260 | 390 | 350 | 1000 |

FIG.9

| | | WEIGHT VALUE |
|---|---|---|
| PRODUCT | PRODUCT 1 | 12.5 (1000/80) |
| | PRODUCT 2 | 3.125 (1000/320) |
| | PRODUCT 3 | 6.667 (1000/150) |
| | PRODUCT 4 | 2.222 (1000/450) |

EVALUATING APPARATUS AND EVALUATING PROGRAM PRODUCT

CROSS-REFERENCE TO RELATED APPLICATIONS

This application is based upon and claims the benefit of priority from Japanese Patent Application No. 2010-75415, filed on Mar. 29, 2010; the entire contents of which are incorporated herein by reference.

FIELD

Embodiments described herein relate generally to an evaluating apparatus and an evaluating program.

BACKGROUND

A study has been made for a technique of calculating a degree of fatigue of a PC (Personal Computer) by measuring a vibration or temperature of the PC. There has also been proposed an apparatus that acquires information of a PC by a sensor and presents to a customer a probability of trouble occurrence for an individual component or for the PC. In this technique, a model is constructed, which is for monitoring whether operation data of a product has a suitable value that does not lead to failure/breakdown, and whether the product is going to be broken or not is evaluated with the use of the model. In a quality control section of hardware, a technique of evaluating a rate of repair of a product from repair data has been accumulated.

As techniques of evaluating a quality of a product, an analysis of service-life data, which takes censored observation of a product into consideration, and a semi-supervised learning have been known. In the analysis of the service-life data taking the censoring into consideration, information, which indicates that the product operated without being broken at the time when the observation was censored, is used for censored observation data. This analysis method can be used for the construction of a failure model with respect to an accumulated load, such as a service life with respect to an accumulated operation time. However, it cannot be used for the construction of a failure model with respect to an observation item, such as a temperature or acceleration, which is not an accumulated value.

The semi-supervised learning is a machine learning technique using both of labeled data and unlabeled data. For example, a technique of K. Nigam and A. McCallum and S. Thrun and T. Mitchell, "Learning to Classify Text from Labeled and Unlabeled Documents", Proc. of the 15$^{th}$ National Conf. on Artificial Intelligence, pp. 792-799, 1998 has been known.

In the case of using a model as mentioned above, when the number of failure data pieces and non-failure data pieces are small (e.g., when the product has just been shipped out), it is difficult to construct a high-precise model. Furthermore, there may be a case in which operation data, which cannot be classified into failure or non-failure, is present, because of the discontinuation of the observation.

BRIEF DESCRIPTION OF THE DRAWINGS

FIG. 2 is a view illustrating one example of a data structure of operation data;

FIG. 3 is a view illustrating one example of a data structure of failure data;

FIG. 4 is a flowchart illustrating an entire flow of a process by the evaluating apparatus according to the first embodiment;

FIG. 8 is a view illustrating one example of the number of observed operation data pieces;

FIG. 9 is a view illustrating a weight value calculated with respect to the operation data illustrated in FIG. 8;

DETAILED DESCRIPTION

In general, according to one embodiment, an evaluating apparatus includes an operation data storage unit, a labeling unit, a learning unit, and an evaluating unit. The operation data storage unit stores operation data of a product. The labeling unit applies a failure label, indicating that the product is broken down, to the operation data of the product that is broken down within a designated period of time from the observation date of the operation data, while applies a non-failure label, indicating that the product is not broken down, to the operation data of the product that is not broken down within a designated period of time from the observation date of the operation data. The labeling unit applies neither the failure label nor the non-failure label to the operation data of the product, which is not certain that it is broken down or not within a designated period of time from the observation date of the operation data. The learning unit learns the distribution of the operation data by using the operation data having applied thereto the failure label or the non-failure label, and the operation data having applied thereto neither the failure label nor the non-failure label, so as to produce a failure model in which a probability of product failure is modeled. The evaluating unit evaluates the probability of product failure based upon the failure model and the operation data.

Exemplary embodiments of the evaluating apparatus will be described below in detail with reference to the attached drawings.

First Embodiment

An evaluating apparatus according to a first embodiment applies labels including "failure", "non-failure", and "no label" to observed operation data, constructs a failure probability model by additionally using the operation data having no label, and evaluates the operation data from the constructed failure probability model. Thus, even in the situation where the number of operation data pieces are small, e.g., when the product has just been shipped out, a high-precise determination model can be constructed by utilizing the operation data having no label. Specifically, whether a product is broken down or not within a designated period of time can be estimated with high precision.

The "operation data" means data representing a using condition of a product. A failure probability model, in which a failure probability of a product is predicted from the operation data, is constructed beforehand, and the failure probability model is used, whereby a failure of individual product can be predicted from the operation data obtained by monitoring the product. The "failure probability model" means a probability model that determines a broken-down product or unbroken product from the operation data.

Figure 1:
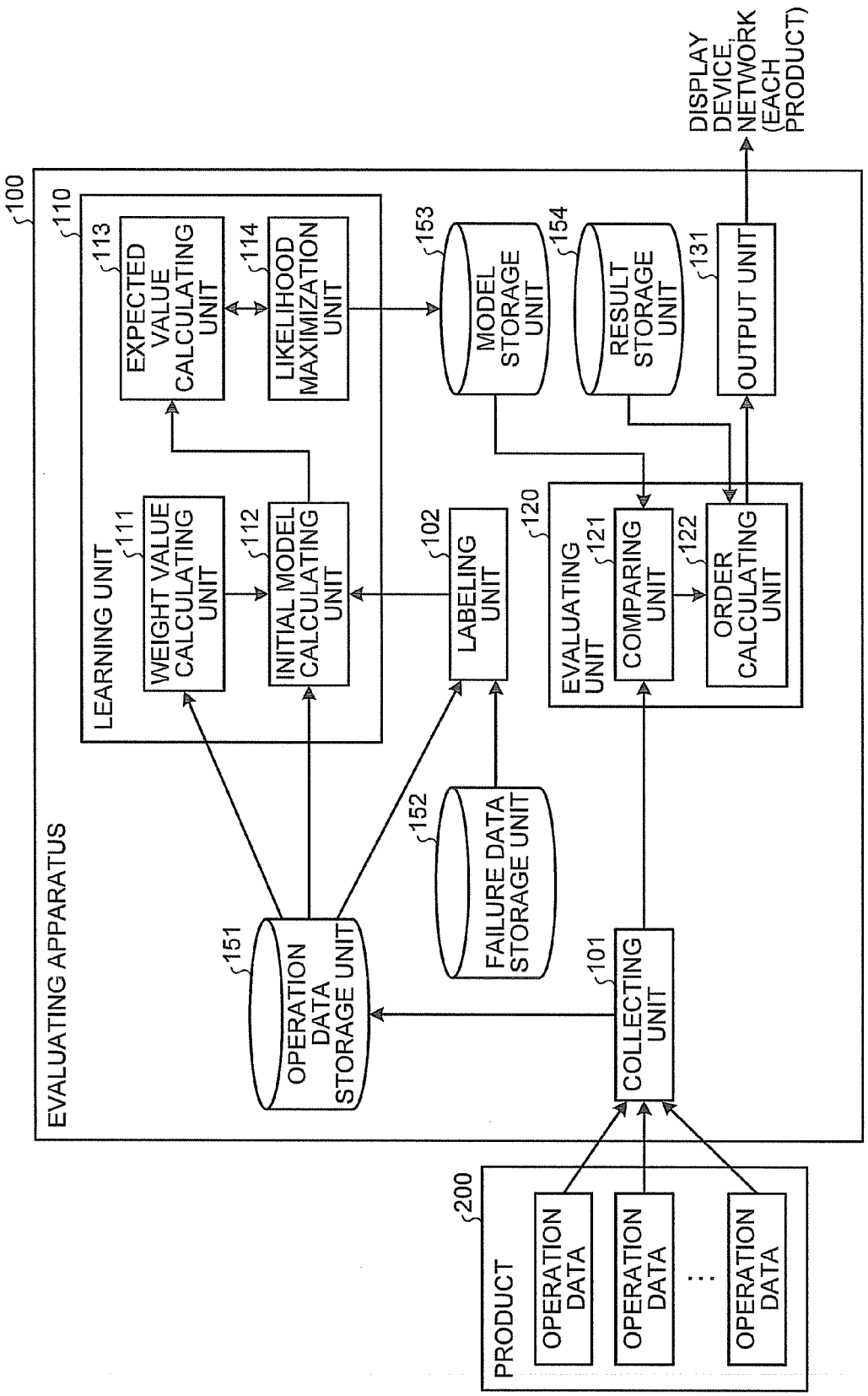
FIG. 1 is a block diagram illustrating an evaluating apparatus according to a first embodiment.

FIG. 1 is a block diagram illustrating one example of a configuration of an evaluating apparatus 100 according to a first embodiment. As illustrated in FIG. 1, the evaluating apparatus 100 includes an operation data storage unit 151, a failure data storage unit 152, a model storage unit 153, a result storage unit 154, a collecting unit 101, a labeling unit 102, a learning unit 110, an evaluating unit 120, and an output unit 131.

The evaluating apparatus 100 is connected to plural products 200 through network (not illustrated) such as the Internet or LAN in such a manner that the evaluating apparatus 100 and the products 200 can communicate with each other. In FIG. 1, only one product 200 is illustrated, but the number of the product is optional.

FIG. 1 illustrates that the evaluating apparatus 100 is installed as a server device on the network. The function same as the evaluating apparatus 100 may be applied to the product (client PC, etc.) All of the storage units (operation data storage unit 151, the failure data storage unit 152, the model storage unit 153, the result storage unit 154) or some of the storage units may be provided at the server, and the other units may be provided at the client PC. For example, the operation data storage unit 151, the failure data storage unit 152, and the model storage unit 153 may be provided in the evaluating apparatus 100, and the result storage unit 154 may be provided in the client PC.

The operation data storage unit 151 stores the operation data of each product received by the collecting unit 101. The operation data includes an observation date and an observation value, and it is stored for each product. FIG. 2 is a diagram illustrating one example of a data structure of the operation data.

FIG. 2 illustrates the operation data including a product ID, observation date, temperature, acceleration in vertical direction, tilt angle, number of times of operating button, current, voltage, continuously-used time, revolution of fan, presence/absence of occurrence of data-reading error, accumulated used time, accumulated number of times of operating button, and accumulated number of times of occurrence of data-reading error. The product ID information is identification information for identifying each product. The items including the temperature and the succeeding factors are only examples, and any items indicating the condition of use of the product can be included in the operation data.

The failure data storage unit 152 stores failure data that is information of a broken product. For example, the failure data is created when a broken product is repaired in a repair center, and stored in the failure data storage unit 152. FIG. 3 is a view illustrating one example of a data structure of the failure data.

FIG. 3 illustrates the example of the failure data including a product ID, the date when the product was broken, the broken-part ID for identifying the broken part, and broken-part category indicating the type of the broken part. Other items may be included in the failure data, so long as they include at least information by which the broken product is identified (product ID, etc.) and information specifying the data when the part was broken.

The model storage unit 153 stores a parameter, which is constructed through the learning of the operation data and the failure data by the learning unit 110, and which indicates the failure probability model. The result storage unit 154 stores the evaluation result by the evaluating unit 120.

The operation data storage unit 151, the failure data storage unit 152, the model storage unit 153, and the result storage unit 154 can be configured by any storage mediums, which are popularly used, such as HDD (Hard Disk Drive), optical disk, memory card, or RAM (Random Access Memory).

The collecting unit 101 collects the operation data from each product, and stores the resultant into the operation data storage unit 151. The collecting unit 101 collects the operation data from each product periodically or in real time through network, and stores the resultant into the operation data storage unit 151.

The labeling unit 102 refers to the operation data storage unit 151 and the failure data storage unit 152, and applies a label, indicating whether a product is broken or not within a designated period from the observation date, to each operation data. For example, the labeling unit 102 applies a label "broken" indicating that the product is broken to the operation data, when the product ID of the operation data matches and the failure data having the date when the product is broken falls within the designated period from the observation date is stored in the failure data storage unit 152. When operation data is collected in a period over the designated period from the observation date, and the failure data storage unit 152 does not store the failure data in which the product ID matches and the date when the product was broken falls within the designated period from the observation date, the labeling unit 102 applies a label of "unbroken", indicating that the product is not broken, to this operation data.

The labeling unit 102 applies neither "broken" label nor "unbroken" label to the operation data, from which it cannot be determined whether the product is broken or not within the designated period, since the observation is censored or it is immediately after the start of the operation. In the following description, the operation data to which neither "broken" label nor the "unbroken" label is applied has applied thereto a label of "no label" indicating that the product cannot be determined to be "broken" or "unbroken" (that it is unclear the product is broken or unbroken). The labeling method described above is only illustrative, and any methods, which can identify whether a product is broken or unbroken or which can identify that it cannot be determined whether the product is broken or unbroken, can be employed.

The learning unit 110 learns the distribution of the operation data by using not only the labeled operation data but also the unlabeled operation data (the data to which "no label" is applied), so as to create the failure probability model in which the probability of product failure is modeled. The learning unit 110 includes a weight value calculating unit 111, an initial model calculating unit 112, an expected value calculating unit 113, and a likelihood maximization unit 114.

The weight value calculating unit 111 calculates a weight of the operation data according to the number of observed operation data pieces. It is possible that, among the operation data pieces used for constructing the failure probability model, the operation period of one broken product is extremely long, and the operation period of another broken product is extremely small. In this case, the constructed model may be biased to one broken product having the maximum number of observation of the operation data. It is desirable that a model, which is biased to a product having the maximum number of observation of the operation data, i.e., a product that has been operated for a long period, is prevented from being constructed. In view of this, the weight value calculating unit 111 sets a weight value to each operation data according to the number of observation of the operation data. The weight value calculating unit 111 calculates a weight value that increases as the number of observation increases.

The initial model calculating unit 112 calculates a parameter of an initial model upon constructing the failure probability model. The expected value calculating unit 113 calculates an expected value of a likelihood indicating the credibility of the failure probability model based upon the probability that the "broken" label or the "unbroken" label is applied to the unlabeled operation data. The likelihood maximization unit 114 obtains a parameter of the failure probability model that maximizes the likelihood.

The evaluating unit 120 evaluates the operation data collected by the collecting unit 101 by using the constructed failure probability model. The evaluating unit 120 includes a comparing unit 121, and an order calculating unit 122.

The comparing unit 121 evaluates whether the operation data to be evaluated is close to the distribution of a broken product or to the distribution of an unbroken product, and transmits an evaluation result indicating whether a product is broken or not to the output unit 131. The order calculating unit 122 obtains an evaluation value that is great as the probability of product failure is high, for every product, so as to calculate the order of the evaluation value.

The output unit 131 outputs the evaluation result by the evaluating unit 120 to a display device (not illustrated) or to a network.

The process of the evaluating apparatus 100 thus configured according to the first embodiment will next be described with reference to FIG. 4. FIG. 4 is a flowchart illustrating an entire flow of the process by the evaluating apparatus 100 according to the first embodiment. It is presupposed below that the operation data is collected by the collecting unit 101, and stored in the operation data storage unit 151.

Firstly, the labeling unit 102 refers to the operation data storage unit 151 and the failure data storage unit 152 to create a label for each product, and performs a labeling process for applying the created label to the operation data (step S101). The detail of the labeling process will be described later.

Next, the learning unit 110 determines whether to learn the failure probability model or not (step S102). For example, the learning unit 110 determines to learn the failure probability model every time a fixed period has elapsed, or when a user instructs to create a model.

When the failure probability model is learned (step S102: Yes), the learning unit 110 executes a probability model learning process so as to construct the failure probability model from the operation data (step S103). The probability model learning process will be described in detail later.

After the probability model learning process is completed, or when it is determined in step S102 that the failure probability model is not learned (step S102: No), the evaluating unit 120 executes an operation data evaluating process for evaluating the operation data with the use of the failure probability model (step S104). The detail of the operation data evaluating process will be described later.

Figure 5:
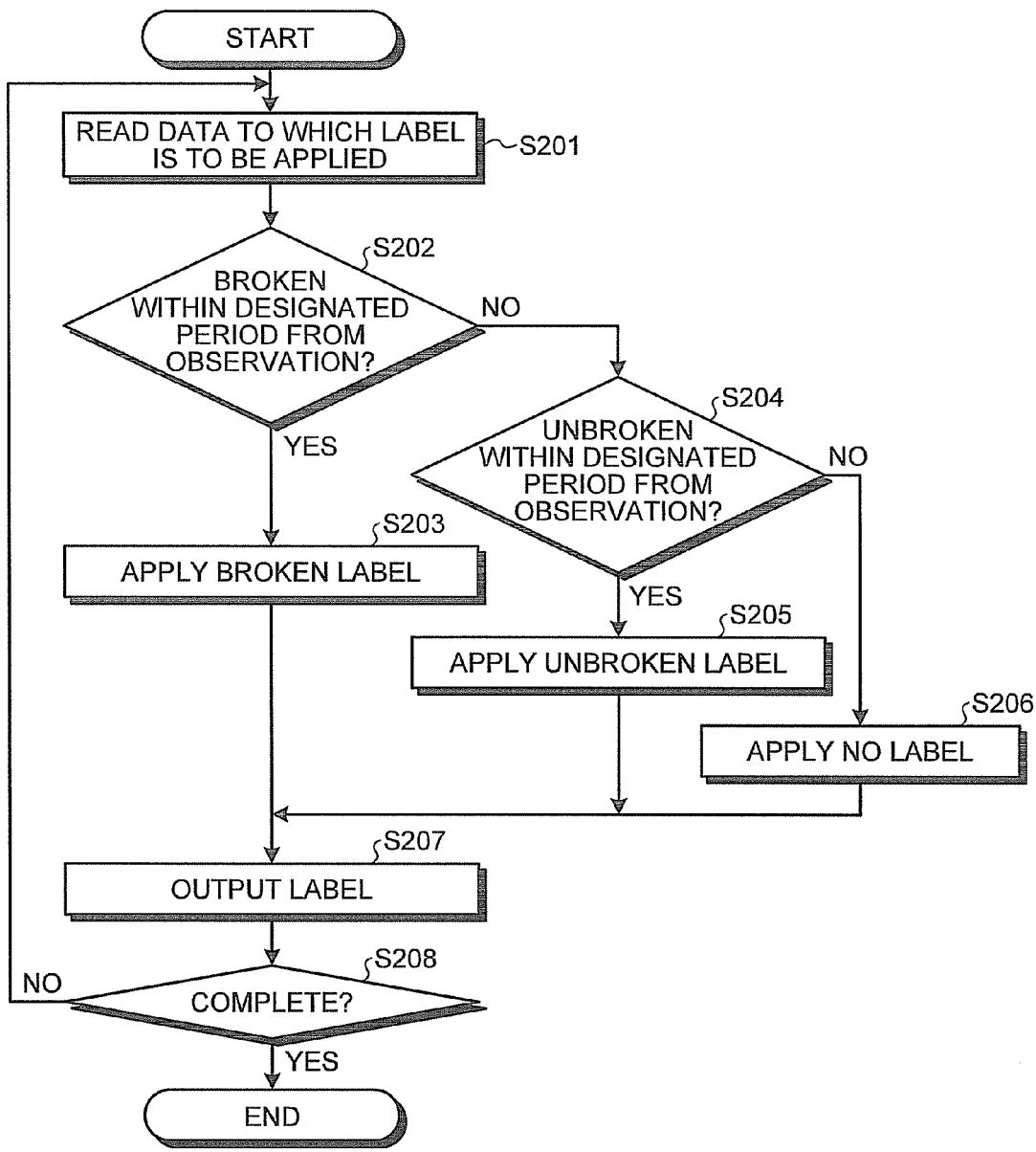
FIG. 5 is a flowchart illustrating an entire flow of a labeling process by the evaluating apparatus according to the first embodiment.

The detail of the labeling process in step S101 will next be described with reference to FIGS. 5 and 6. FIG. 5 is a flowchart illustrating an entire flow of the labeling process by the evaluating apparatus 100 according to the first embodiment.

Firstly, the labeling unit 102 reads the operation data to which a label is not applied from the operation data storage unit 151 (step S201). The labeling unit 102 determines whether a failure occurs within a designated period from an observation date of the read operation data (step S202). When the failure occurs during the designated period from the observation date (step S202: Yes), the labeling unit 102 applies the "broken" label to the read operation data (step S203).

When the failure does not occur during the designated period from the observation date (step S202: No), the labeling unit 102 determines whether the failure occurs or not during the designated period from the observation date of the read operation data (step S204). When the failure does not occur (step S204: Yes), the labeling unit 102 applies the "unbroken" label to the read operation data (step S205).

There may be the case in which the operation data has a period to which neither "broken" label nor "unbroken" label is applied, since it is unclear whether the failure occurs or not during the designated period from the observation of the operation data due to the discontinuation of the observation. In the case in which it cannot be determined that the failure does not occur (step S204: No), the labeling unit 102 applies the label of "no label" to the read operation data (step S206).

The labeling unit 102 outputs the applied label (step S207), and determines whether the labeling process is completed for all operation data pieces (step S208). When it is not completed (step S208: No), the labeling unit 102 reads the next operation data to repeat the process (step S201). When the labeling process is completed (step S208: Yes), the labeling process is ended.

Figure 6:
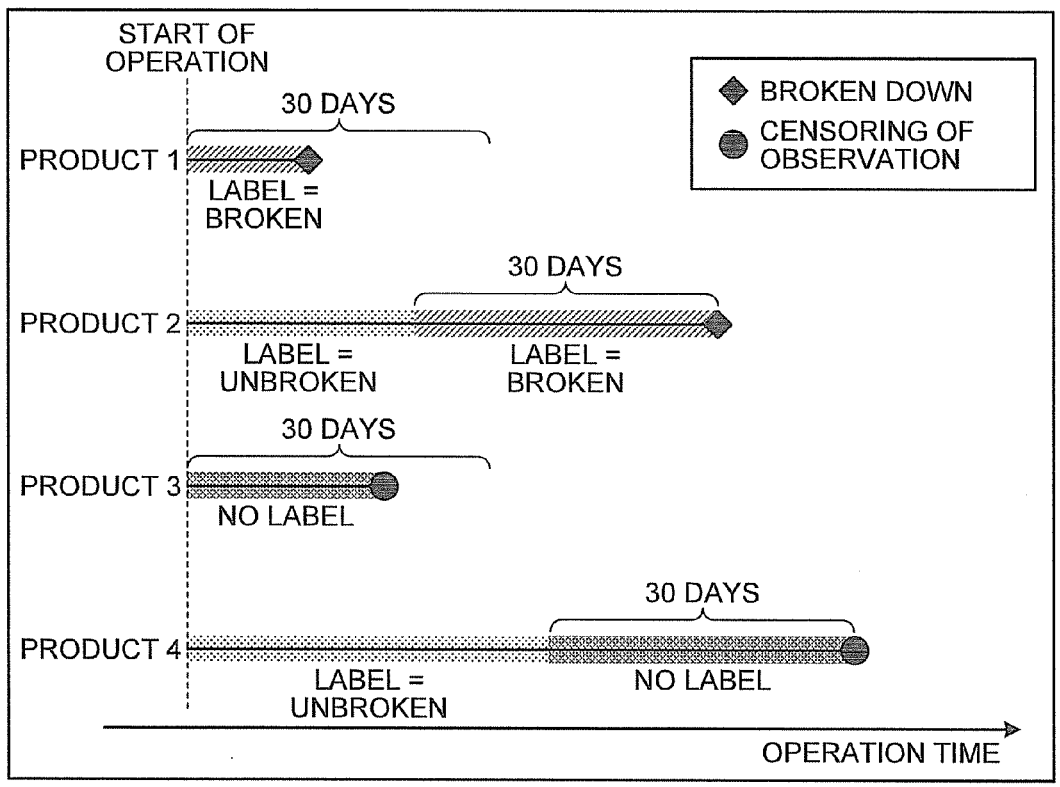
FIG. 6 is an explanatory view illustrating a specific example of the labeling process.

FIG. 6 is an explanatory view illustrating a specific example of the labeling process. In the example of FIG. 6, the designated period is set to 30 days. Specifically, the operation data in which the failure occurs within 30 days from the observation of the operation data has applied thereto the "broken" label. A black rectangle in FIG. 6 indicates that the failure occurs at this point. A black circle in FIG. 6 indicates that the observation is censored at this point.

In a product 1, the "broken" label is applied to all operation data pieces at all observation dates. In a product 2, the "broken" label is applied to the operation data in the period 30 days before the date when the failure occurs, including the date when the failure occurs. On the other hand, the operation data of the product 2, over 30 days before the date when the failure occurs, has applied thereto the "unbroken" label.

In a product 3, the observation is censored before 30 days have elapsed from the start of the operation. Therefore, it is unclear whether the failure occurs or not within 30 days from the observation date of the operation data. Accordingly, the label of "no label" is applied to the operation data pieces at all observation dates in the product 3.

In a product 4, the operation data in the period 30 days before the discontinuation of the observation, including the date when the observation is censored, has applied thereto the label of "no label", since it is unclear whether or not the failure occurs within 30 days from the observation date. On the other hand, the "unbroken" label is applied to the operation data over 30 days before the date when the observation is censored, since the failure does not occur within 30 days from the observation date.

Figure 7:
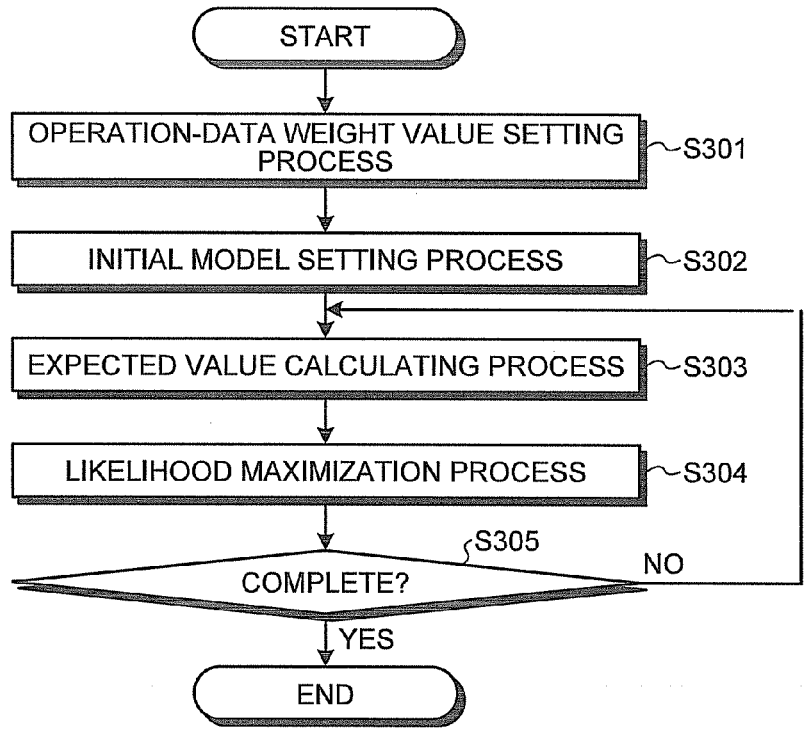
FIG. 7 is a flowchart illustrating an entire flow of a probability model learning process by the evaluating apparatus according to the first embodiment.

The detail of the probability model learning process in step S103 will next be described with reference to FIG. 7. FIG. 7 is a flowchart illustrating the entire flow of the probability model learning process by the evaluating apparatus 100 according to the first embodiment.

Firstly, the weight value calculating unit 111 sets a weight value to each operation data according to the number of observation of the operation data (step S301). The weight value is calculated by an equation (1) described below. It is to be noted that N indicates the number of total products, and $M_j$ indicates the number of operation data pieces of a product j ($1 \leq j \leq N$).

$$\text{Load value } W_j \text{ of operation data of project } j = \frac{\text{Number of observation of operation data pieces of all products}}{\text{Number of observation of operation data pieces of product } j} = \frac{\sum_{j=1}^{N} M_j}{M_j} \quad (1)$$

FIG. 8 is a view illustrating examples of the number of observed operation data pieces. FIG. 9 illustrates weight values calculated according to the equation (1) for the operation data in FIG. 8. In a product 1 in FIG. 9, the number of observation of operation data pieces of all products is 1000, and the number of observation of the operation data of the product 1 is 80. Therefore, the weight value is calculated as 12.5 that is derived from 1000/80. As described later, the weight value is multiplied upon counting the number of operation data pieces of each product. This weight value is also multiplied upon calculating the likelihood.

Returning to FIG. 7, the initial model calculating unit 112 sets the initial model upon constructing the failure probability model (step S302). The learning unit 110 revises the model based upon the initial model.

The initial model calculating unit 112 sets the initial model by using only the operation data pieces to which the "broken" label or the "unbroken" label are applied. In other words, the initial model calculating unit 112 does not use the operation data to which "no label" is applied.

Figure 10:
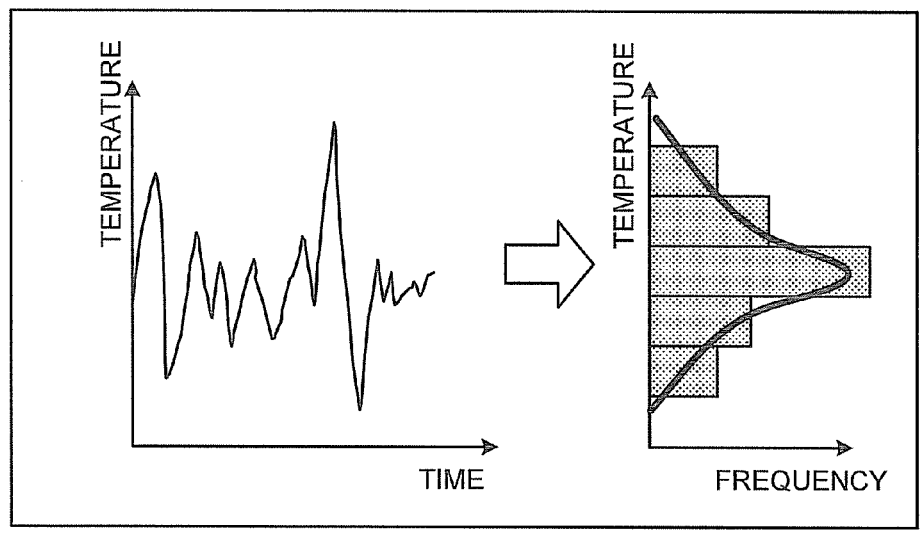
FIG. 10 is an explanatory view illustrating one example of a calculation of an initial model by an initial model calculating unit.
Figure 11:
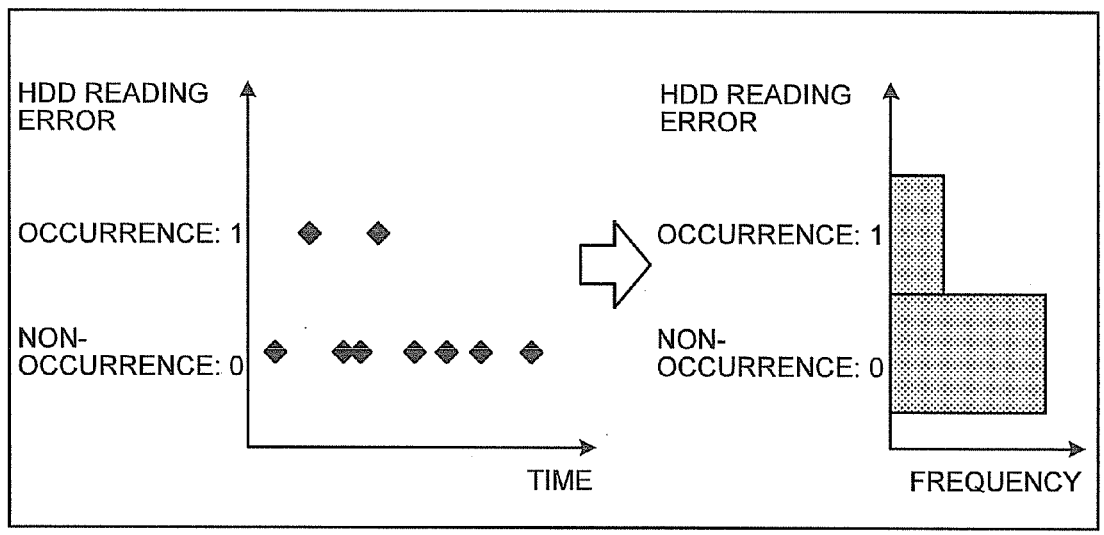
FIG. 11 is an explanatory view illustrating one example of a calculation of an initial model by an initial model calculating unit.

FIGS. 10 and 11 are explanatory views illustrating one example of the calculation of the initial model by the initial model calculating unit 112. The initial model calculating unit 112 obtains a distribution of each value of each item (e.g., temperature, acceleration, current) of the operation data for each of the broken product and unbroken product, thereby constructing the initial model. When it obtains the distribution of the broken product, it uses, among the operation data pieces used for the construction of the model, the operation data pieces of all broken products at all observation dates to which the "broken" label is applied. When obtaining the distribution of the unbroken product, it uses the operation data pieces of all products to which the "unbroken" label is applied at all observation dates.

When the item assumes a continuous value as illustrated in the example in FIG. 10, the values may be classified to obtain a histogram, or a parametric distribution such as a normal distribution may be applied. On the other hand, in the case of an item assuming a discrete value as illustrated in the example in FIG. 11, a histogram may suitably be applied.

When the initial model calculating unit 112 counts an appearance frequency by the value of each item of the operation data, it counts the appearance frequency by using the weight value calculated by the weight value calculating unit 111. The initial model calculating unit 112 obtains a frequency distribution that is standardized in such a manner that 1 is obtained through an integration in all sections.

The initial model calculating unit 112 obtains an initial value of a parameter of the distribution of the operation data. In the following description, a method for obtaining the initial value of the parameter of the distribution for a certain collection item i (e.g., temperature) among the operation data pieces will be described. The initial value for the broken product is defined as $\theta_{i1}^{ini}$ and the initial value for the unbroken product is defined as $\theta_{i0}^{ini}$. The initial values $\pi n_{i0}^{ini}$ and $\pi_{i1}^{ini}$ of a mixing coefficient are calculated from an equation (2) described below.

$$\pi_{i0}^{ini} = \frac{N_0}{N_0 + N_1}, \quad (2)$$

$$\pi_{i1}^{ini} = \frac{N_1}{N_0 + N_1}$$

Here, $N_1$ represents the number of observation of the operation data to which the "broken" label is applied, and $N_0$ represents the number of observation of the operation data to which the "unbroken" label is applied.

Returning to FIG. 7, the expected value calculating unit 113 and the likelihood maximization unit 114 construct the failure probability model by using not only the operation data to which the "broken" label or "unbroken" label is applied but also the data having applied thereto the "no label" (steps S303, S304). An algorithm for constructing the failure probability model will be described below. The symbols used for the explanation will be described in an equation (3) described below.

$c \in \{0,1\}$: broken=1/unbroken=0

$x_{ijk}$: value of kth operation data in ith operation-data collecting item of jth product $z_{ijkc}$: latent variable $\theta_{ic}$: parameter relating to ith operation-data collecting item in probability distribution (other than mixing coefficient)

$\theta_{i0}$: unbroken, $\theta_{i1}$: broken $$\pi_{ic}: \text{mixing coefficient} \quad (3)$$

$$\sum_{c=0}^{1} \pi_{i0} + \pi_{i1} = 1$$

z is a latent variable representing a label applied to each operation data of each product. As for the operation data having the label of "no label" applied thereto, z is not observed.

The mixing distribution of the item i of the operation data of the broken product and the unbroken product is expressed by an equation (4) below.

$$p(x_i | \theta_i, \pi_i) = \sum_{c=0}^{1} \pi_{ic} p(x_i | \theta_{ic}) \quad (4)$$

It is supposed that all latent variables can be observed, i.e., it is supposed that the labels of the operation data having no label are clear. The perfect likelihood function in this case can be expressed by an equation (5) below.

$$p(x_i, z_i \mid \theta_i, \pi_i) = \prod_{j=1}^{N} \prod_{k=1}^{M_j} \prod_{c=0}^{1} \pi_{ic}^{z_{ijkc}} p(x_{ijk} \mid \theta_{ic})^{z_{ijkc}} \quad (5)$$

Accordingly, the log likelihood function can be expressed by an equation (6) below.

$$\log p(x_i, z_i \mid \theta_i, \pi_i) = \sum_{j=1}^{N} \sum_{k=1}^{M_j} \sum_{c=0}^{1} z_{ijkc} \{\log \pi_{ic} + \log p(x_{ijk} \mid \theta_{ic})\} \quad (6)$$

However, in the case of the operation data having no label, the latent variable $z_{ijkc}$ cannot be observed in actuality. In view of this, the expected value calculating unit 113 obtains an expected value of the perfect likelihood function for the posterior distribution of the latent variable (step S303). The expected value (burden ratio) of $z_{ijkc}$ for the posterior distribution of the latent variable expressed by an equation (7) below can be obtained from an equation (8) below.

$$p(z_{ijkc} \mid x_{ijk}, \theta_{ic}, \pi_{ic}) \propto p(x_{ijk}, z_{ijkc} \mid \theta_{ic}, \pi_{ic}) \quad (7)$$

$$E[z_{ijkc}] = \frac{\pi_{ic} p(x_{ijk} \mid \theta_{ic})}{\sum_{c=0}^{1} \pi_{ic} p(x_{ijk} \mid \theta_{ic})} \equiv \gamma_{ijkc} \quad (8)$$

When the operation data k of a product j has no label, the expected value is calculated from the equation (8). However, when the "broken" label or the "unbroken" label is applied, the expected value is expressed by equations (9) and (10) below, respectively.

$$\gamma_{ijk0}=1, \gamma_{ijk1}=0 \quad (9)$$

$$\gamma_{ijk0}=0, \gamma_{ijk1}=1 \quad (10)$$

The expected value for the perfect, log likelihood function is calculated from an equation (11) below.

$$\log E_z[\log p(x_i, z_i \mid \theta_i, \pi_i)] = \sum_{j=1}^{N} \sum_{k=1}^{M_j} \sum_{c=0}^{1} \gamma_{ijkc} \{\log \pi_{ic} + \log p(x_{ijk} \mid \theta_{ic})\} \quad (11)$$

The expected value calculating unit 113 calculates the weighted log likelihood function expressed by an equation (12) below, considering the weight value calculated from the equation (1). As represented by the equation (1), $w_j$ is a different value depending upon which product the operation data belongs to.

$$L_i = \sum_{j=1}^{N} w_j \sum_{k=1}^{M_j} \sum_{c=0}^{1} \gamma_{ijkc} \{\log \pi_{ic} + \log p(x_{ijk} \mid \theta_{ic})\} \quad (12)$$

The likelihood maximization unit 114 assumes the expected value for z, and maximizes the log perfect likelihood function, in the equation (11), to which the weight value is multiplied (step S304). A Q function is defined as in an equation (13) below.

$$Q(\theta_i, \pi_i, \theta_i^{old}, \pi_i^{old}) = \sum_{j=1}^{N} w_j \sum_{k=1}^{M_j} \sum_{c=0}^{1} \gamma_{ijkc}^{old} \{\log \pi_{ic} + \log p(x_{ijk} \mid \theta_{ic})\} \quad (13)$$

$\theta_i$ and $\pi_i$ used in the equation (8) are used for $\theta_i^{old}$ and $\pi_i^{old}$. An equation (14) described below is established from the equation (8).

$$\gamma_{ijkc}^{old} = \frac{\pi_{ic}^{old} p(x_{ijk} \mid \theta_{ic}^{old})}{\sum_{c=0}^{1} \pi_{ic}^{old} p(x_{ijk} \mid \theta_{ic}^{old})} \quad (14)$$

The likelihood maximization unit 114 maximizes the Q function with respect to the mixing coefficient $\pi_i$ by using an equation (15) below.

$$\pi_i^{new} = \underset{\pi_i}{\arg\max} Q(\theta_i, \pi_i, \theta_i^{old}, \pi_i^{old}) \quad (15)$$

In order to satisfy a restriction equation illustrated in an equation (16) below, $\pi_i^{new}$ in the equation (15) is obtained from Lagrange's method of undetermined multipliers as in an equation (17) below.

$$\sum_{c} \pi_{ic} = \pi_{i0} + \pi_{i1} = 1 \quad (16)$$

$$\pi_{ic}^{new} = \frac{\sum_{j=1}^{N} w_j \sum_{k=1}^{M_j} \gamma_{ijkc}^{old}}{\sum_{j=1}^{N} w_j M_j} \quad (17)$$

The likelihood maximization unit 114 maximizes the Q function with respect to the distribution parameter $\theta_i$ by using an equation (18) below.

$$\theta_i^{new} = \underset{\theta_i}{\arg\max} Q(\theta_i, \pi_i, \theta_i^{old}, \pi_i^{old}) \quad (18)$$

When $\theta_i$ and $\pi_i$ that maximize the Q function are calculated from the above-mentioned process, they are substituted into $\theta_i^{old}$ and $\pi_i^{old}$ in the equation (14) so as to calculate the left side of the equation (14). The likelihood maximization unit 114 again maximizes the Q function calculated from the equation (13).

The learning unit 110 repeatedly performs the calculations in steps S303 and S304 recursively so as to determine whether the likelihood maximization calculation becomes convergent or not (step S305). When the likelihood maximization calculation does not become convergent (step S305: No), the learning unit 110 repeats the calculation described above. When the likelihood maximization calculation becomes convergent (step S305: Yes), the learning unit 110 ends the probability model learning process. For example, the learning unit 110 determines that the likelihood maximization calculation becomes convergent, when the variation width of the Q function and at least one of the variation widths of the parameters $\theta_i$ and $\pi_i$ becomes smaller than a predetermined threshold value. The learning unit 110 sets the $\theta_i$ and $\pi_i$ when the likelihood maximization calculation becomes convergent as a parameter estimated value of the failure probability model. The initial value of $\theta_i^{old}$ and $\pi_i^{old}$ is $\theta_{i0}^{ini}$, $\theta_{i1}^{ini}$, $\pi_{i0}^{ini}$, and $\pi_{i1}^{ini}$ obtained by the initial model calculating unit 112.

The learning unit 110 independently obtains the parameter of the failure probability model for each item i of the operation data. The learning unit 110 stores the obtained parameter in the model storage unit 153.

From the above-mentioned process, the distribution of the broken products and the distribution of the unbroken products are learned from the operation data having applied thereto the "broken" label, "unbroken" label, or "no label" label. The construction of the failure probability model using the data having no label applied thereto according to probability comparing process (step S401) by the comparing unit 121 and a failure probability order calculating process (step S402) by the order calculating unit 122. The failure/non-failure probability comparing process and the failure probability order calculating process can independently be executed. Accordingly, it may be configured such that the evaluating unit 120 executes at least one of the failure/non-failure probability comparing process and the failure probability order calculating process.

In the failure/non-failure probability comparing process, the comparing unit 121 obtains which distribution of a broken product and unbroken product the operation data to be evaluated is close to. In the present embodiment, an identification using Naive Bayes classification is performed, and it is supposed that each of the collecting items i of the operation data is independent. Specifically, an equation (19) described below is supposed to be established.

$$p(c \mid x) \propto p(c)p(x \mid c) = p(c)\prod_{i=1}^{D} p(x_i \mid c) \quad (19)$$

D represents a number of items of the operation data, c represents a variable indicating that a product is broken or unbroken (when a product is broken, c is 1, and when a product is unbroken, c is 0), and $x_i$ represents the ith collecting item of the operation data. In this case, the result of applying the broken label or the unbroken label to the operation data i of the product j is calculated from an equation (20) described below.

$$\hat{c}_{jk} = \underset{c}{\operatorname{argmax}}\left(p(c)\prod_{i=1}^{D} p(x_{ijk} \mid c)\right) = \underset{c}{\operatorname{argmax}}\left(p(c)\prod_{i=1}^{D} p(x_{ijk} \mid \theta_{ic}, \pi_{ic})\right) \quad (20)$$

$x_{ijk}$ represents a value of kth operation data of ith operation-data collecting item of the jth product. The values obtained by the learning unit 110 are used for $\theta_{ic}$ and $\pi_{ic}$.

When the operation data k that satisfies the equation the present embodiment provides a great effect, when the number of failure data pieces and non-failure data pieces are small, and the ratio of the data having no label applied thereto is great. The model using only a small number of the failure data pieces and non-failure data pieces is less-precise, while the precision of the model is expected to be enhanced by the present embodiment in which the information about the observed value of the data having no label is also utilized.

As illustrated in FIG. 6, the point immediately after the start of the shipment of the product corresponds to the condition in which the number of the failure data pieces and the non-failure data pieces are small, but the ratio of the data having no label is great. To monitor the product immediately after the start of the shipment of the product is extremely important in view of the quality control. Thus, the effect obtained by constructing the high-precise model according to the present embodiment has significance.

The model obtained by the present embodiment can be utilized for warning that a product is almost broken from the distribution of the value of the operation data. Specifically, the constructed failure probability model can be utilized for monitoring the "value" of the time-series operation data. In this case, the information involved with the temporal change of the value is not used, but a high monitoring is made possible, compared to the monitoring by the comparison of a threshold value such as an upper-limit value or a lower-limit value widely used for monitoring the time-series data.

Figure 12:
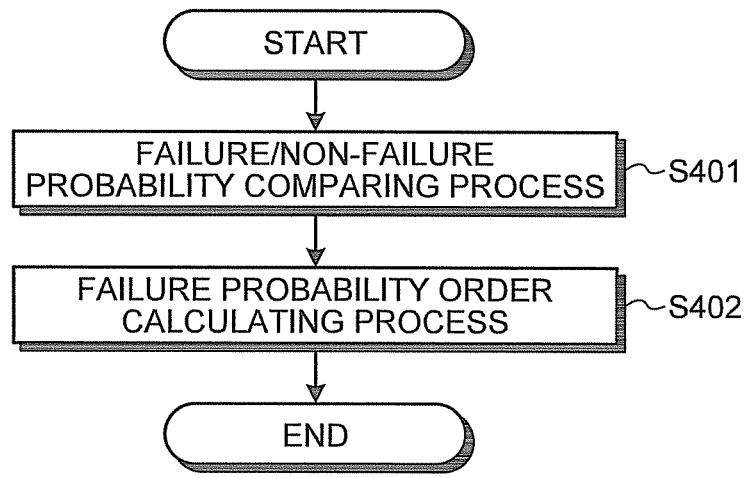
FIG. 12 is a flowchart illustrating an entire flow of an operation data evaluating process by the evaluating apparatus according to the first embodiment.

The detail of the operation-data evaluating process in step S104 will next be described with reference to FIG. 12. FIG. 12 is a flowchart illustrating an entire flow of the operation-data evaluating process by the evaluating apparatus 100 according to the first embodiment.

The evaluating unit 120 executes a failure/non-failure (21) described below at plural observation points is used to determine whether the product j is broken or unbroken, the comparing unit 121 obtains the result of the identification from an equation (22) described below.

$$k \in K_j \quad (21)$$

$$\hat{c}_j = \underset{c}{\operatorname{argmax}}\left(\prod_{k \in K_j}\left(p(c)\prod_{i=1}^{D} p(x_{ijk} \mid c)\right)\right) = \underset{c}{\operatorname{argmax}}\left(\prod_{k \in K_j}\left(p(c)\prod_{i=1}^{D} p(x_{ijk} \mid \theta_{ic}, \pi_{ic})\right)\right) \quad (22)$$

The Naive Bayes identification (or Normal Bayes classification) is one of techniques in a machine learning, and it has been known that a relatively excellent identification performance is obtained from an experiment (e.g., P. Domingos and M. Pazzani, "On The Optimality of The Simple Bayesian Classifier under Zero-One Loss", Machine Learning, 29, pp. 103-130, 1997). The identification method is not limited to the Naive Bayes identification, but a logistic regression model may be used, for example.

In the failure probability order calculating process, the order calculating unit 122 compares the operation conditions of plural products, and makes a relative evaluation of the operation condition of the product j. The order calculating unit 122 takes the logarithm of a posterior failure probability, and uses a value, which is obtained by dividing the logarithm by the number of the observation of the operation data $|K_j|$ used for the determination, as the evaluation result.

$$R_j = \frac{1}{|K_j|}\log\left(\prod_{k \in K_j} p(c=1)\prod_{i=1}^{D} p(x_{ijk} \mid c=1)\right) = \frac{1}{|K_j|}\log\left(\prod_{k \in K_j} p(c=1)\prod_{i=1}^{D} p(x_{ijk} \mid \theta_{i1}, \pi_{i1})\right) \quad (23)$$

Figure 13:
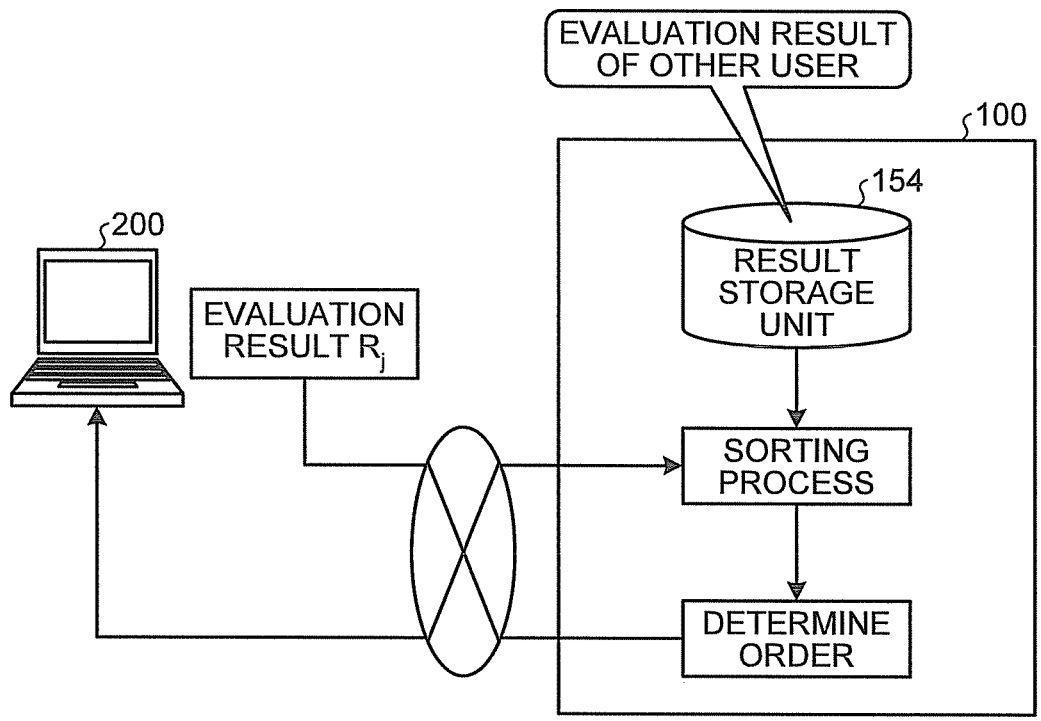
FIG. 13 is a view illustrating a specific example of a failure probability order calculating process.

FIG. 13 is a view illustrating a specific example of the failure probability order calculating process. In the example in FIG. 13, an evaluation result $R_j$ is calculated in a product 200 such as a client PC, and the evaluation result is transmitted to a server. Specifically, FIG. 13 illustrates the example in which the product 200 has a function of the evaluating unit 120. In this example, the constructed failure probability model is transmitted to each product 200, and each product 200 calculates the evaluation result from own operation data by using the transmitted failure probability model. This configuration provides an effect of distributing a load.

The result storage unit 154 stores the transmitted evaluation result $R_j$ of the evaluating unit 120. The evaluation results of the other products 200 are calculated by the other products 200, and the transmitted evaluation result is held in the result storage unit 154 of the evaluating apparatus 100. The order calculating unit 122 of the evaluating apparatus 100 calculates the relative order of the evaluation result (sorting process, order determination), and returns the calculated order to the product 200. As another embodiment, it may be configured such that the client PC (product 200) holds the result storage unit 154.

When the evaluating unit 120 is provided in the evaluating apparatus 100, the output unit 131 outputs the evaluation result of the evaluating unit 120 on a display device such as a display or to network.

Modification

In the present modification, the designated period from the observation of the operation data to the occurrence of the failure, which is used for applying the "broken" label or the "unbroken" label by the labeling unit 102, is set to be a variable value.

In the example in FIG. 6, the "broken" label is applied to the operation data within 30 days from the observation of the operation data, in which the failure occurs, while the operation data over 30 days before the date when the failure occurs has applied thereto the "unbroken" label. In the present modification, the designated period (30 days in FIG. 6) from the observation of the operation data to the occurrence of the failure is set to have an optional variable value.

Since the designated period means "a product is broken or unbroken within an optional period" when the operation data is observed, it is desirable that the set value can be changed depending upon the way the constructed identification model is used. Therefore, during the normal monitoring of the operation data, "whether a product is broken or unbroken within 30 days" is monitored, and when a product is desired to be monitored in detail, such as the case immediately after the start of the shipment, a short-period monitoring for "whether a product is broken or unbroken within 7 days" can be performed.

Figure 14:
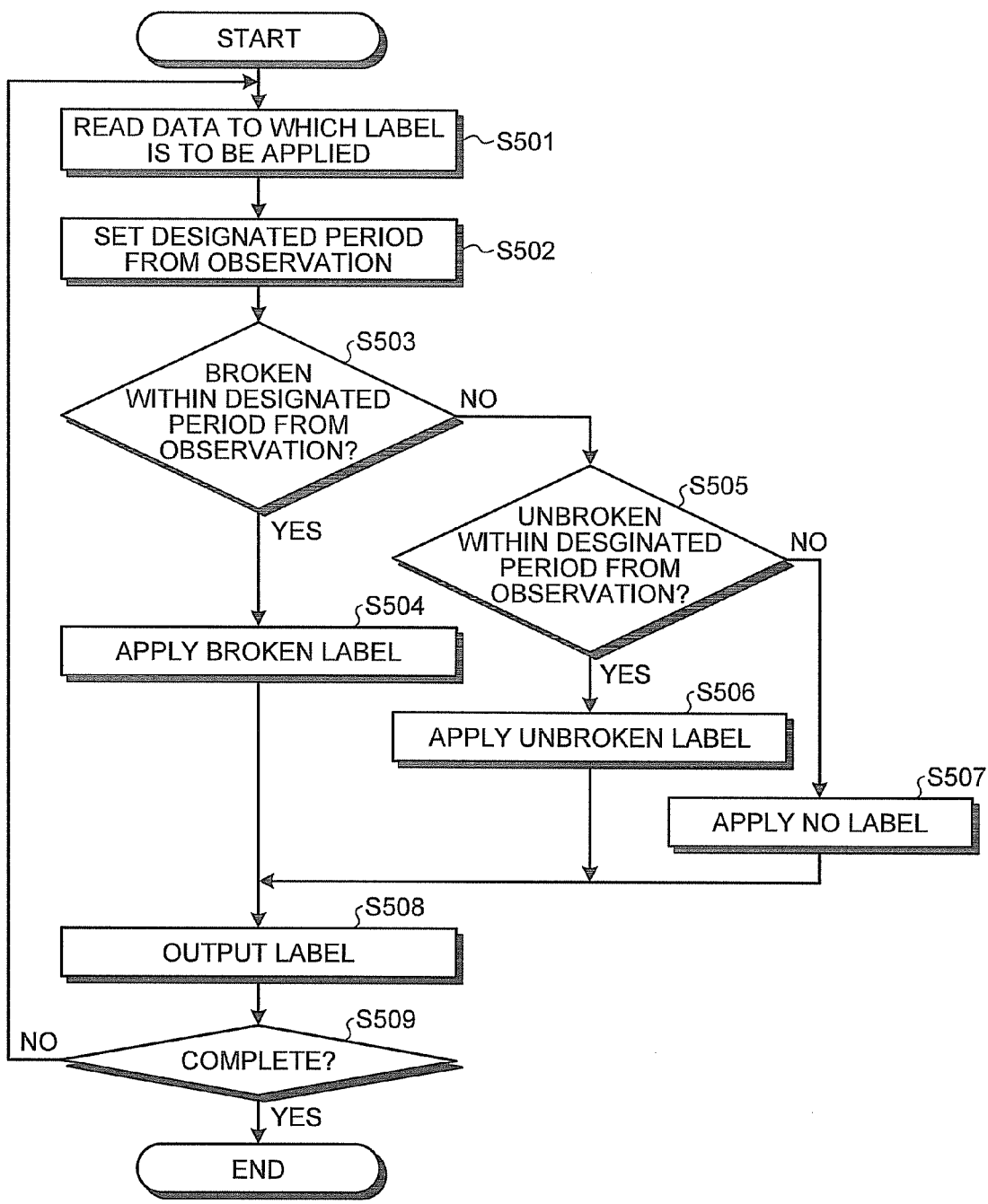
FIG. 14 is a flowchart illustrating an entire flow of a labeling process according to a modification of the first embodiment.

FIG. 14 is a flowchart illustrating the entire flow of the labeling process according to the modification of the first embodiment. The flowchart in FIG. 14 is different from the flowchart in FIG. 5 in that the designated period from the observation can be designated as an optional value in step S502. The other processes are the same as those in FIG. 5, so that the description will not be repeated.

As described above, according to the evaluating apparatus of the first embodiment, the "broken" label, the "unbroken" label, or the label of "no label" is applied to the observed operation data, and the failure probability model is constructed by also using the operation data to which the label of "no label" is applied, so as to evaluate the operation data according to the constructed failure probability model. Thus, even in the condition in which the number of the operation data pieces is small, such as the case immediately after the start of the shipment, a high-precise failure/non-failure determining model can be constructed. The use of the constructed model enables the determination and analysis as to which one of the failure or non-failure the condition of use of each user is close to, or the evaluation such as the ranking of the failure probability among all users.

Second Embodiment

In the first embodiment, the label of "no label" is applied to the operation data at the observation date within 30 days from the discontinuation of the observation, since it is not certain whether the failure occurs or not within 30 days from the observation date.

As for the operation data having the observation date (it is supposed to be Y date) 25 days before the discontinuation of the observation (it is supposed to be X date), it is clear that the product is not broken within 25 days from the observation, and it is not certain whether the product is broken or unbroken within 5 days from the discontinuation of the observation. Therefore, in this case, it can be said that the probability of the product being broken within 30 days from the Y date is lower than the probability of the product being broken within 30 days from the X date. The present embodiment considers this condition, and how to handle the operation data to which the label of "no label" is applied upon constructing the failure probability model is changed from that in the first embodiment.

Figure 15:
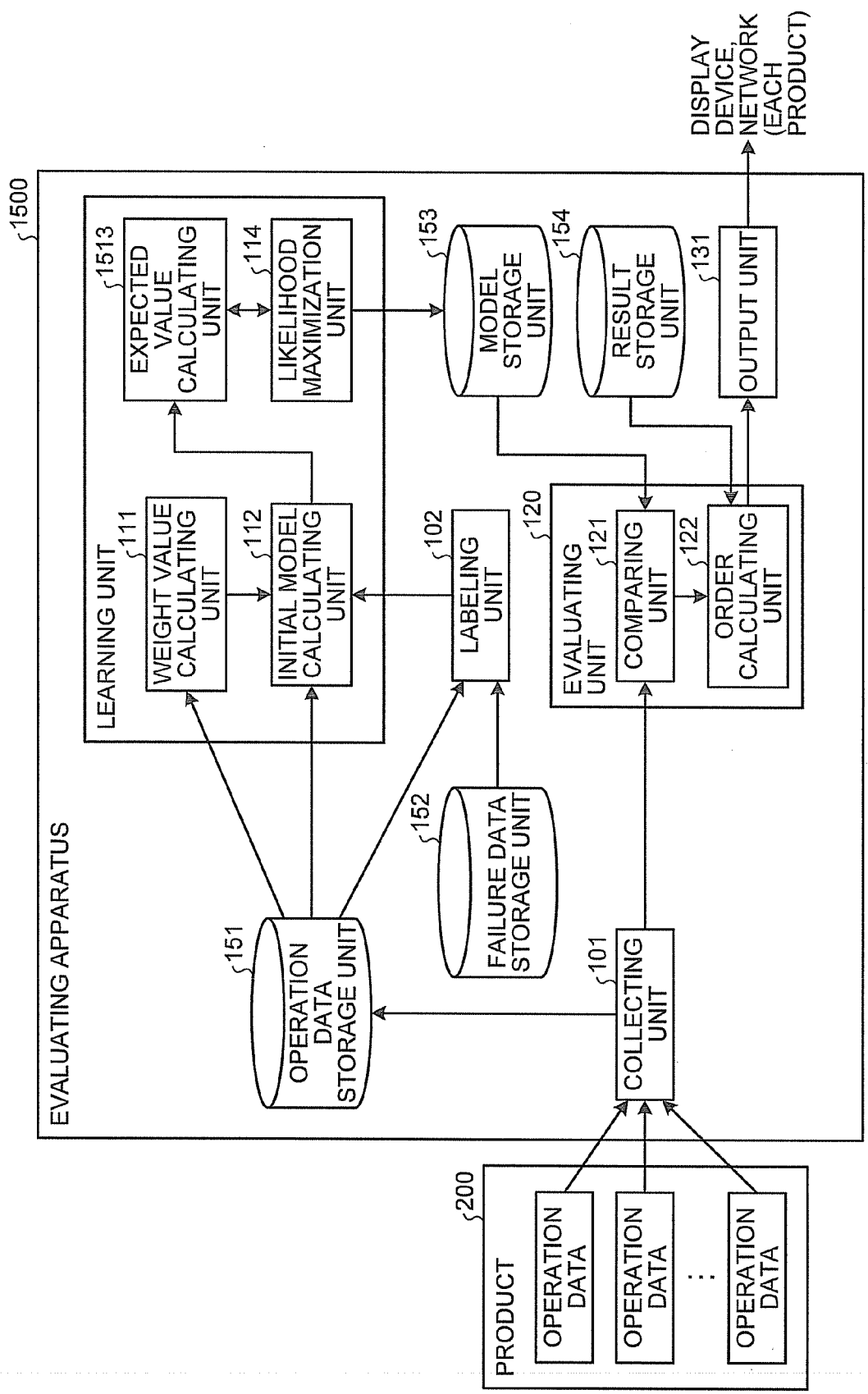
FIG. 15 is a block diagram illustrating an evaluating apparatus according to a second embodiment.

FIG. 15 is a block diagram illustrating one example of a configuration of an evaluating apparatus 1500 according to the second embodiment. As illustrated in FIG. 15, the function of an expected value calculating unit 1513 in the second embodiment is different from that in the first embodiment. The other configurations and functions are the same as those in the block diagram illustrating the configuration of the evaluating apparatus 100 in the first embodiment. Therefore, the same numerals are given to the same components, and the description will not be repeated.

It is supposed below that the failure probability is constant regardless of time (it is supposed that the probability of failure in one day is defined as P). The designated period from the observation of the operation data to the occurrence of the failure (30 days in the above-mentioned example) upon applying the "broken" label and the "unbroken" label is defined as T. The probability of a product j being broken within a period $\tau_j = Y + T - X_j$, which is from the date $X_j$ when the observation of the product j is censored to the date of Y+T when the designated period T has elapsed from the observation date Y, is expressed by an equation (24) below. The ratio of the failure probability between the period T and the period $\tau_j$ is expressed by an equation (25) below. In the equation (25), the probability of the product failure in one day is assumed to be extremely small (P<<1), and approximation is performed.

$$\sum_{t=1}^{\tau_j} P(1-P)^{t-1} \tag{24}$$

$$\frac{\sum_{t=1}^{\tau_j} P(1-P)^{t-1}}{\sum_{t=1}^{T} P(1-P)^{t-1}} \approx \frac{\sum_{t=1}^{\tau_j} P}{\sum_{t=1}^{T} P} = \frac{\tau_j}{T} \tag{25}$$

In view of this, in the present embodiment, the equation (14) that is for the data having no label applied thereto is changed to equations (26) and (27) below.

$$\begin{cases} \gamma_{ijk1}^{old} = \dfrac{\dfrac{\tau_j}{T} \cdot \pi_{i1}^{old} p(x_{ijk} \mid \theta_{i1}^{old})}{\pi_{i0}^{old} p(x_{ijk} \mid \theta_{i0}^{old}) + \dfrac{\tau_j}{T} \cdot \pi_{i1}^{old} p(x_{ijk} \mid \theta_{i1}^{old})} \\ \gamma_{ijk0}^{old} = 1 - \gamma_{ijk1}^{old} \end{cases} \quad (26)$$
$$(27)$$

With this change, the information relating to the fact that the product j is unbroken during the period of $(T-\tau_j = X_j - Y)$ is utilized, whereby the model is highly possibly made precise.

Figure 16:
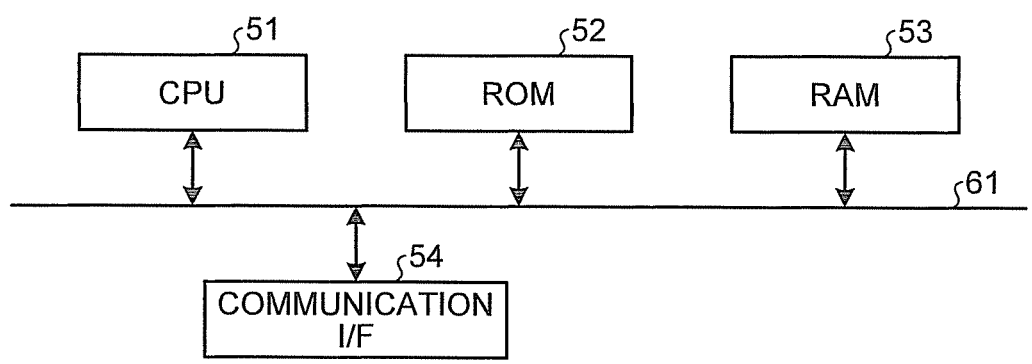
FIG. 16 is a diagram illustrating a structure of hardware of the evaluating apparatus according to the first and second embodiments.

Next, the hardware configuration of the evaluating apparatus according to the first and second embodiments will be described with reference to FIG. 16. FIG. 16 is an explanatory view illustrating the hardware configuration of the evaluating apparatus according to the first and second embodiments.

The evaluating apparatus according to the first and second embodiments includes a control device such as a CPU (Central Processing Unit) 51, a storage device such as a ROM (Read Only Memory) 52 or a RAM (Random Access Memory) 53, a communication I/F 54 that performs communication through network, an external storage device such as HDD (Hard Disk Drive) or CD (Compact Disk) drive device, a display device such as a display apparatus, an input device such as a keyboard or mouse, and a bus 61 that is connected to each unit. Specifically, it is the hardware configuration utilizing a normal computer.

The evaluating program executed by the evaluating apparatus according to the first and second embodiments is recorded in a computer-readable storage medium, such as CD-ROM (Compact Disk Read Only Memory), flexible disk (FD), CD-R (Compact Disk Recordable), DVD (Digital Versatile Disk), in a file in an installable format or executable format, and is provided as a computer program product.

It may be configured such that the evaluating program executed by the evaluating apparatus according to the first and second embodiments is stored on a computer, which is connected to network such as the Internet, and downloaded through the network. The evaluating program executed by the evaluating apparatus according to the first and second embodiments may be configured to be provided or distributed through the network such as the Internet.

The evaluating program executed by the evaluating apparatus according to the first and second embodiments may be configured to be installed in a ROM or the like beforehand.

The evaluating program executed by the evaluating apparatus according to the first and second embodiments has a module configuration including the above-mentioned respective units (collecting unit, labeling unit, learning unit, evaluating unit, output unit). As an actual hardware, the CPU 51 (processor) reads and executes the evaluating program from the storage medium, whereby the respective units are loaded on the main storage device, and therefore, the respective units are produced on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An evaluating apparatus comprising:
    an operation data storage unit configured to store operation data of a product, the operation data including an observation date, the observation date representing a date that observed the operational data;
    a labeling unit configured to apply a broken label, which indicates that a product is broken, to the operation data of the product that is broken within a designated period from an observation date of the operation data, apply an unbroken label, which indicates that a product is not broken, to the operation data of the product that is not broken within the designated period from the observation date, and apply neither the broken label nor the unbroken label to the operation data if it is unclear that the product is broken or not within the designated period from the observation date;
    a learning unit configured to learn the distribution of the operation data by using the operation data to which the broken label or the unbroken label is applied and the operation data to which neither the broken label nor the unbroken label is applied, in order to create a failure model in which a probability of product failure is modeled; and
    an evaluating unit configured to evaluate the probability of product failure based upon the failure model and the operation data, wherein
    the learning unit comprises:
        an expected value calculating unit configured to calculate an expected value of a likelihood indicating credibility of the failure model with respect to the operation date; and
        a likelihood maximization unit configured to calculate a parameter of the failure model that maximizes the expected value.

2. The apparatus according to claim 1, wherein
the learning unit further comprises a weight value calculating unit configured to calculate a weight value, which is greater in a product having an increased number of observation of the operation data, for every product, wherein
the expected value calculating unit calculates the expected value weighted by the weight value for each operation data.

3. The apparatus according to claim 1, wherein
the expected value calculating unit calculates, for the operation data having no label applied thereto, the expected value such that the smaller the difference between the designated period and the period from the observation date to the observation discontinuation is, the more the likelihood that a product is not broken is increased.

4. The apparatus according to claim 1, wherein
the evaluating unit calculates the probability of the product being broken down and the probability of the product not being broken down based upon the failure model and the operation data, and evaluates that the product is to be broken down, when the probability of the product being broken down is higher than the probability of the product not being broken down.

5. The apparatus according to claim 1, wherein
the evaluating unit calculates, for every product, an evaluation value that is greater as the probability of the product being broken down is great, based upon the failure model and the operation data, in order to calculate the order of the evaluation value.

6. A computer program product having a non-transitory computer readable medium including programmed instructions for evaluating a failure of a product, wherein the instructions, when executed by a computer, causes the computer to perform:

applying a broken label, which indicates that a product is broken, to the operation data of the product that is broken within a designated period from an observation date;

applying an unbroken label, which indicates that a product is not broken, to the operation data of the product that is not broken within the designated period from the observation date;

applying no label to the operation data if it is unclear that the product is broken or not within the designated period from the observation date;

learning the distribution of the operation data by using the operation data to which the broken label or the unbroken label is applied and the operation data to which neither the broken label nor the unbroken label is applied, in order to create a failure model in which a probability of a product failure is modeled; and evaluating the probability of product being broken down based upon the failure model and the operation data, wherein the learning comprises calculating an expected value of a likelihood indicating credibility of the failure model with respect to the operation data; and calculating a parameter of the failure model that maximizes the expected value.

* * * * *